J. ROHRER.
Bee Hive.
No. 33,451.
Patented Oct. 8, 1861.
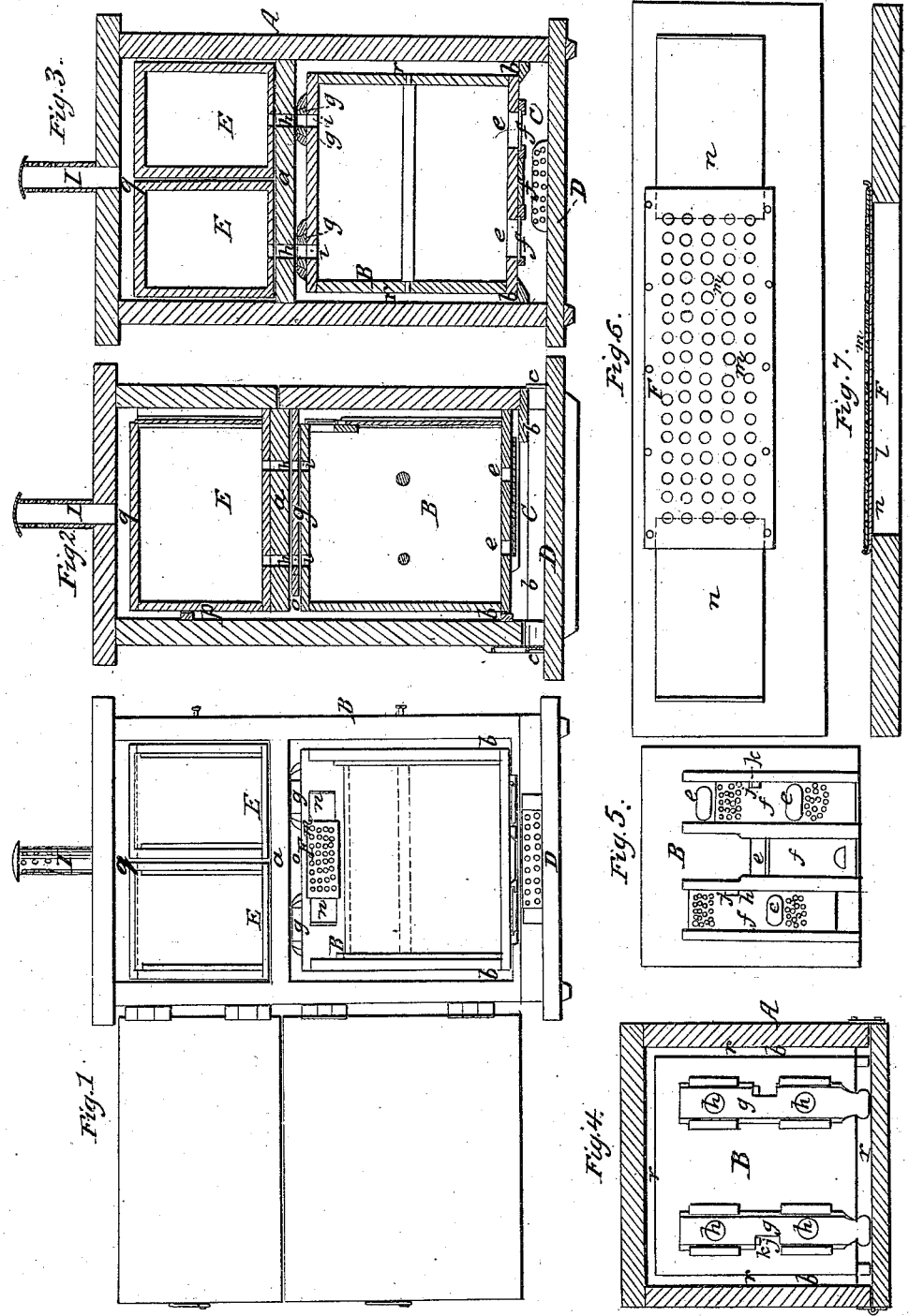

UNITED STATES PATENT OFFICE.

JEREMIAH ROHRER, OF MIDDLETOWN, PENNSYLVANIA.

IMPROVEMENT IN BEE-HIVES.

Specification forming part of Letters Patent No. 33,451, dated October 8, 1861.

*To all whom it may concern:*

Be it known that I, JEREMIAH ROHRER, of Middletown, in the county of Dauphin and State of Pennsylvania, have invented a new and useful Improvement in Air-Chamber Bee-Hives; and I do hereby declare that the following is a full, clear, and exact description of the same, reference being had to the accompanying drawings, forming part of this specification, in which—

Figure 1 is a front view of my hive, the doors being open. Fig. 2 is a vertical longitudinal section of the same. Fig. 3 is a vertical transverse section; Fig. 4, a horizontal section, and Fig. 5 an inverted plan. Figs. 6 and 7 are views of the ventilator of the working-chamber of the hive.

My invention consists—

First, in the general construction and arrangement of the several parts of the hive, whereby convenience of managing it, perfect ventilation, a regular temperature, and greater safety to the bees and comb are secured.

Second. In the combination, with the working-chamber of the hive, of a ventilator which is arranged within the outer case of the hive and has its slide made in two parts which can be moved separately in opposite directions. By having the slide made in two parts the ventilation-passages can also be opened by simply moving the slides apart within the outer casing, and thus greater convenience is afforded and the necessity of having one end of the slide extend out through the side of the outer casing obviated, and thus all chance for moth or vermin to crawl through the crevices between the slide and the case prevented.

Third. In the combination of slides which are perforated and have a notch in their side with the working-chamber of a bee-hive and the stop-pins thereof, as hereinafter described, whereby the slides can be accurately adjusted relatively to the bee-passages of the working and surplus chambers, both when forced in and drawn out, and thus a full opening always obtained when desirable, or a full cut-off effected without any particular attention to the adjustment of the slides other than simply sliding them in or out, as necessity may require, and, besides this, all of the cut-off slides are operated within the outer casing.

To enable others skilled in the art to make and use my hive, I will describe it with reference to the drawings.

A is the outer frame, of rectangular form and divided into two chambers by a partition $a$. Some distance above the bottom edge of the frame, on the inside, cleats $b\ b\ b$ are arranged for the support of the working-chamber B, as shown in Figs. 1, 2, and 3. Thus elevating the chamber B forms an air-chamber C between the bottom board D and the bottom of the chamber B. At the front and rear of the air-chamber C slides $c\ c'$ are placed, the slide $c$ serving as the bee-entrance passage and the slide $c'$ as a ventilation and feed passage.

The bottom of the working-chamber B is perforated with a series of oblong holes $e$ for the bees to pass to and from said chamber. These holes are covered with slides $f\ f$, which are reticulated so as to ventilate, and also furnished with larger openings for the passage of the bees into the chamber.

The idea of forming the air-chamber C and having the entrance-passages $e\ e$ elevated is to protect the comb from moisture in damp weather and to place the bees beyond the reach of moth, and also to have the bees around the elevated passages act as a guard against the attack of their enemies. The chamber further provides room for the introduction of a feed-drawer through the slide-covered passage $c'$, and supplies air to the body of the hive.

On the top of the working-chamber B two slides $g$, with passages $h$ in them, are arranged so as to move in and out over passages $i$ in the top of the working-chamber B and under passages in the surplus-honey boxes E E and in the partition $a$. These slides are notched on one of their sides, as shown at $j$, and said notched portion plays back and forth against a stationary stop $k$, as shown in Fig. 4. The notches and stops control the extent of the in and outward movement of the slides, and thus a full opening or a complete closing of the passages can always be effected with certainty. There is also a ventilator F arranged near the top on the front of the working-chamber B. This ventilator is formed by cutting an oblong slot $l$ through the chamber and fitting a perforated sheet-metal plate $m$ over said slot and then slipping two slides $n\ n$ behind the raised plate, as shown in Figs.

1, 6, and 7. The object of this ventilator is to regulate the state of the working-chamber, and this is done by moving the slides $n$ $n$ toward or from each other.

It will be observed that the surplus-boxes and the partition on which they rest are so arranged relatively to the working-chamber and the back of the hive that an air-space $o$ $p$ $q$ exists. It will also be observed that the working-chamber has an air-space $r$ on all sides existing between it and the outer frame.

On the top of the outer frame a perforated ventilator or tube I is placed, so that the air which circulates through and around the working-chamber and surplus-honey boxes may pass off.

By having the air-spaces around the several chambers of the hive an equable temperature is maintained at all seasons of the year, and the bees thereby kept in a more healthful condition, and at the same time a perfect ventilation is secured.

What I claim as my invention, and desire to secure by Letters Patent, is—

1. The combination of the air-chamber C, working-chamber B, provided with the ventilating and cut-off slides and apertures F $m$ $n$ $n$ $g$ $g$ $j$ $k$, air-spaces $o$ $p$ $q$ $r$, and ventilator I, all arranged in the manner and for the purposes herein described.

2. The combination, with the working-chamber B, of the ventilator F, which consists of an oblong slot $l$, perforated plate $m$, and the divided slide $n$ $n$, the whole being arranged on the front of the working-chamber B and within the outer casing A, in the manner and for the purpose described.

3. The combination, with the working-chamber B and stop-pins $k$ thereof, of the slides $g$, which are perforated and have a notch $j$ in one of their edges, in the manner and for the purposes herein described.

Witness my hand in the matter of my improvement in air-chamber bee-hives.

J. ROHRER.

Witnesses:
EDM. F. BROWN,
ROBT. W. FENWICK,